United States Patent
Chmiel et al.

(10) Patent No.: US 6,872,416 B2
(45) Date of Patent: Mar. 29, 2005

(54) AROMATIZED SOLUBLE CREAMER POWDER

(75) Inventors: Oliver Chmiel, Orbe (CH); Marc Furrer, Blonay (CH); Hanspeter Maier, Mörfelden-Walldorf (DE); Heinz Wyss, Oberdiessbach (CH)

(73) Assignee: Nestec S.A., Vevey (CH)

( * ) Notice: Subject to any disclaimer, the term of this patent is extended or adjusted under 35 U.S.C. 154(b) by 183 days.

(21) Appl. No.: 09/908,216

(22) Filed: Jul. 18, 2001

(65) Prior Publication Data

US 2002/0018839 A1 Feb. 14, 2002

Related U.S. Application Data

(63) Continuation of application No. PCT/EP99/10492, filed on Dec. 30, 1999.

(30) Foreign Application Priority Data

Jan. 28, 1999 (EP) .............................. 99200241

(51) Int. Cl.⁷ .............................. A23C 11/00; A23F 5/40
(52) U.S. Cl. ................. 426/588; 426/564; 426/590
(58) Field of Search ................. 426/570, 386, 426/388, 602, 90, 471, 590, 594, 564, 588, 591

(56) References Cited

U.S. PATENT DOCUMENTS

| | | | |
|---|---|---|---|
| 3,823,241 A | 7/1974 | Patel et al. ............ 426/386 |
| 4,478,040 A | 10/1984 | Johnson ............ 60/225 |
| 5,030,473 A | 7/1991 | Ghodsizadeh ............ 426/650 |
| 5,222,364 A | 6/1993 | Carns et al. ............ 62/15 |
| 5,400,972 A | 3/1995 | Maier et al. ............ 239/422 |
| 5,417,993 A * | 5/1995 | Takano et al. ............ 426/312 |
| 5,554,400 A * | 9/1996 | Stipp ............ 426/78 |
| 5,928,703 A | 7/1999 | Chmiel et al. ............ 426/594 |
| 6,174,557 B1 * | 1/2001 | Gamez-Rumpf et al. ... 426/594 |
| 6,177,119 B1 * | 1/2001 | Zeller et al. ............ 426/594 |
| 6,290,997 B1 * | 9/2001 | Villagran et al. ............ 426/72 |
| 6,447,830 B1 * | 9/2002 | Cevallos et al. ............ 426/594 |

FOREIGN PATENT DOCUMENTS

| | | | |
|---|---|---|---|
| EP | 0 885 566 A1 | | 12/1998 |
| GB | 2 301 015 A | | 11/1996 |
| JP | 05-123103 | * | 5/1993 |
| JP | 10-066531 | * | 3/1998 |
| WO | WO 9733482 A1 | * | 9/1997 ........... A23F/00/00 |
| WO | wo 98/07329 | | 2/1998 |

* cited by examiner

*Primary Examiner*—Milton I. Cano
(74) *Attorney, Agent, or Firm*—Winston & Strawn LLP

(57) ABSTRACT

The invention relates to an aromatized, soluble creamer powder. The creamer particles are formed of a matrix of one or more proteins, fats, and carbohydrates, and an aroma system. The aroma system is formed of aqueous coffee aroma components and soluble coffee solids in preferred ratios to help stabilize the unstable aqueous coffee aroma components. The creamer powder may be used, e.g., in soluble coffee beverage powders.

16 Claims, No Drawings

AROMATIZED SOLUBLE CREAMER POWDER

CROSS-REFERENCE TO RELATED APPLICATION

This application is a continuation of the U.S. national phase designation of International application PCT/EP99/10492 filed Dec. 30, 1999, the disclosure of which is expressly incorporated herein by reference thereto.

FIELD OF INVENTION

This invention relates to a soluble creamer powder which contains a coffee aroma. The invention also relates to a process for producing the soluble creamer powder.

BACKGROUND OF THE INVENTION

Soluble creamer powders are well known and are widely used, particularly as coffee or tea creamers. These creamer powders typically contain protein, fats, and sweeteners, but may also include other ingredients such as emulsifiers, stabilizers, and buffers. Further, the creamers come in various forms such as milk-based creamer powders, non-dairy creamer powders, and gassed creamer powders. These creamer powders are typically produced by subjecting a solution containing their components to spray-drying.

When used as a component of coffee beverage powders, the creamer powders may be aromatized to provide the beverage produced upon reconstitution with improved coffee aroma. If natural coffee aroma is used to aromatize the creamer powder, the natural coffee aroma is in the form of organic coffee aroma components, usually carried in coconut oil. An example of such a creamer powder is described in EP application number 0885566.

The aqueous aroma components of natural coffee aroma are not used to aromatize creamer powders since the aqueous aroma components are too unstable. The aqueous aroma components, however, have a good aroma profile and, especially when combined with the organic aroma components, may provide a more complete aroma profile. A coffee flavored beverage powder is described in EP application number 0891715, having at least 25% by mass of soluble coffee solids. When water is added, it provides a coffee drink having a small amount of cream.

Therefore, there is a need for a creamer powder that is relatively stable and which contains aqueous coffee aroma components.

SUMMARY OF THE INVENTION

Accordingly, in one aspect, this invention provides an aromatized, soluble creamer powder comprising a matrix including one or more proteins, fats, and carbohydrates, and an aroma system. The aroma system comprises aqueous coffee aroma components and a stabilizing amount of soluble coffee solids.

It has surprisingly been found that a creamer powder that contains aqueous coffee aroma components and which has good stability, may be prepared by using soluble coffee solids to stabilize the aqueous coffee aroma components. Further, the creamer powder has good aroma.

Preferably, the ratio of aqueous coffee aroma components to soluble coffee solids in the aroma system is about 20:1 to about 1:1. For example, the ratio of aqueous coffee aroma components to soluble coffee solids in the aroma system may be about 10:1 to about 3:1.

The creamer powder preferably contains about 0.05% to about 0.5% by weight of aqueous coffee aroma components, more preferably about 0.1% to about 0.3% by weight. The creamer powder may contain about 0.01% to about 0.1% by weight of soluble coffee solids in the aroma system. Preferably the aqueous coffee aroma components include highly volatile aqueous aroma components that condense at temperatures less than about 0° C.

The creamer powder may be gassed for forming a foam upon reconstitution. Further, the creamer powder may further comprise an organic aroma substrate containing organic coffee aroma components.

In a further aspect, this invention provides a soluble beverage powder comprising about 10% to about 30% by weight of soluble coffee solids, and about 70% to about 90% by weight of a creamer powder as defined above.

In yet a further aspect, this invention provides a process for preparing an aromatized, soluble creamer powder, the process comprising cryogenically collecting coffee aroma components, separating aqueous the coffee aroma components from organic coffee aroma components, adding soluble coffee solids to the aqueous coffee aroma components to provide an aqueous aroma solution, adding the aqueous aroma solution to a creamer concentrate that contains proteins, fats, and carbohydrates to provide an aromatized solution, and drying the aromatized solution to form a powder.

DETAILED DESCRIPTION OF THE INVENTION

Embodiments of the invention are now described by way of example only. The invention is based upon the discovery that a stable, aromatized, soluble creamer powder may be provided by incorporating into the creamer powder aqueous coffee aroma components and soluble coffee solids. It has been found that the soluble coffee solids stabilize the aqueous coffee aroma components and the creamer powder.

The aqueous coffee aroma components are natural aroma components that may be collected during the preparation of soluble coffee powder. This may be done by standard procedures for collecting coffee aroma components, or by suitably modifying the standard procedures. Preferably, the natural aroma components include highly volatile aroma components. Highly volatile aroma components are those which condense at a temperature below about 0° C.

To collect highly volatile aroma components, the standard procedures usually entail flushing volatile aroma components from the coffee during processing using an inert carrier gas such as nitrogen. The aroma-laden carrier gas is then chilled to temperatures lower than about −40° C., and sometimes as low as about −195° C., to cause the aroma components to condense. The condensed aroma components are then collected. The condensed aroma components are then usually absorbed into an aroma substrate, usually an oil. Alternatively, the aromas may be absorbed into the aroma substrate during condensation. Suitable standard procedures are disclosed in, for example, U.S. Pat. Nos. 3,823,241, 5,030,473, and 5,222,364, the disclosures of which are incorporated herein by express reference thereto.

In the standard procedures described above, however, the aromatized aroma substrate obtained contains both aqueous and organic aroma components. In general, the aqueous components are then removed and often discarded because they are unstable and cause instability problems. This leaves the aroma substrate containing substantially only organic aroma components. Instead of discarding these aqueous components, however, the present invention collects these components in the form of an aqueous aroma solution. Shortly after collection, the aqueous aroma components are stabilized by adding a suitable amount of soluble coffee solids to them. Ordinarily, an amount of about 5% to about 50% by dry weight of soluble coffee solids may be added, preferably about 10% to about 30% by dry weight. For example, about 20% by dry weight of soluble coffee solids may be added to the aqueous aroma components. The resulting aqueous aroma solution therefore contains water, aqueous aroma components, and soluble coffee solids.

The aqueous aroma solution is then added to the other components making up the creamer powder prior to drying of the components. Sufficient aqueous aroma solution may be added such that the aqueous coffee aroma components comprise about 0.05% to about 0.5% by weight of the creamer powder, for example about 0.1% to about 0.3%. The soluble coffee solids comprise about 0.01% to about 0.1% by weight of the creamer powder.

The remaining components of the creamer powder may be standard or conventional. Ordinarily, the remaining components include one or more proteins, fats, and carbohydrates forming sweeteners or bulking agents. The amounts of these components may vary depending upon the desired characteristics of the creamer powder.

For example, the creamer powder may contain about 15% to about 30% by weight of non-fat milk solids, about 5% to about 20% by weight of sweet whey, about 5% to about 25% by weight of a suitable edible oil or fat, such as coconut oil, and about 20% to about 70% by weight a suitable food grade sweetener. Suitable sweeteners include carbohydrates such as glucose syrup, corn syrup, sucrose, dextrose, fructose, maltodextrin, and the like, and mixtures of these carbohydrates. Glucose syrup is particularly suitable, especially syrups having a DE in the range of about 35 to about 42. An example of such a creamer powder is described in U.S. patent application Ser. No. 09/086,735 filed May 29, 1998, the disclosure of which is expressly incorporated herein by reference thereto.

As another example, the creamer powder may contain about 40% to about 70% by weight of a sweetener as described above, about 0.5% to about 6% by weight of a water-dispersible or water-soluble protein, such as sodium caseinate, and about 25% to about 45% by weight of an edible oil having a bland flavor and a melting point below 10° C. Especially preferred are vegetable oils in which the fatty acid moieties in the triglyceride comprise at least about 80% by weight of oleic acid and the mass ratio of oleic acid to linoleic acid is about 1:0.01 to about 1:0.09. An example of such a creamer powder is described in U.S. patent application Ser. No. 08/697,226 filed Aug. 21, 1996, the disclosure of which is expressly incorporated herein by reference thereto.

As a further example, the creamer powder may contain about 5% to about 16% by weight of milk proteins, about 16% to about 62% by weight of lactose, about 0.2% to about 28% by weight of fats, and up to about 60% by weight of carbohydrates other than lactose. Examples of these creamer powders are described in U.S. Pat. No. 4,748,040, the disclosure of which is expressly incorporated herein by reference thereto.

The creamer powders may also contain additional ingredients as desired or required. Examples of additional ingredients include artificial sweeteners, surfactants, and the like.

Suitable artificial sweeteners include saccharin, cyclamates, acetosulfame, L-aspartyl based sweeteners, such as aspartame, and mixtures of these. If an artificial sweetener is used, it is suitably combined with bulking agents, such as maltodextrins and polydextrose.

Suitable surfactants include monoglycerides, distilled monoglycerides, diglycerides, glycerol monostearates, sorbitol monostearates, esters or carboxyclic acids with mono- and di-glycerides, monosodium phosphate derivatives of mono- and diglycerides, lecithin, diacetyl tartaric acid esters of mono-diglycerides (data esters), sorbitan esters, diacetyl tartaric acids esters of mono- and di-glycerides, succinylated mono- and diglycerides, acetylated mono- and di-glycerides, hydroxylated lecithin, propylene glycol mono- and di-esters of fatty acids, polyglycerol esters of fatty acids, lactylic esters of fatty acids, and mixtures thereof.

The creamer powder may also contain suitable stabilizers, for example, including dipotassium phosphate and sodium citrate. If stabilizers are used, the amount of stabilizers used may be in the range of about 0.1% to about 5% by weight of the creamer powder.

Suitable flavoring agents, coloring agents, flowing agents, antioxidants, and the like may also be included as desired. A suitable flowing agent is sodium silica aluminate. A possible flavoring and coloring agent is soluble coffee solids.

The creamer powder may be produced by any suitable technique. For example, a standardized solution may be prepared by combining the protein sources and fat sources in selected proportions to obtain a solution of desired fat and solids content. Water may be added as necessary. The sweetener may be dissolved in the standardized solution. The standardized solution is then heat treated, for example at about 105° C. for about 5 seconds. Then the standardized solution is concentrated by evaporation, usually to a total solids concentration of about 40% to about 60% by weight. If desired, the concentrated solution may be homogenized.

If it is desired to have a creamer powder that produces a foamed cream upon reconstitution, the concentrated solution is then gassed by injecting a gas such as air, nitrogen, or carbon dioxide into it. This may be done, for example, at a pressure of about 100 to 400 kPa above the pressure of the homogenized solution.

Whether or not the concentrated solution is gassed, the aqueous aroma solution is added to the concentrated solution immediately prior to drying of the concentrated solution. This offers the advantage of reducing aroma loss during processing. If desired, a standard aroma substrate containing organic aroma components may also be added to the concentrated solution immediately prior to drying.

The concentrated solution is then pumped to the spray nozzle of a spray drier, usually at a pressure of about 2.5 MPa to about 8 MPa, and sprayed. Hot air at a temperature of about 200° C. to about 400° C. is then used to dry the droplets. If desired, a device (such as a screen) may be placed over the hot air inlet to break up the incoming hot air stream into many secondary streams. This offers the advantage of reducing bursting of the droplets of concentrated solution.

The creamer powder obtained may then be agglomerated if desired. Any suitable agglomeration procedure may be used, for example, the procedure described in U.S. Pat. No. 5,400,972, the disclosure of which is expressly incorporated herein by reference thereto. Further suitable aroma substrates may be mixed into the soluble beverage powder at this stage, if desired. Powdered aromas are particularly suitable to be added at this stage. Any desired sweeteners, stabilizers, flavoring agents, and the like may also be mixed in at this stage.

The creamer powder thus obtained may then be mixed with a soluble coffee powder to provide a soluble coffee beverage product. The soluble coffee powder may be any spray- or freeze-dried coffee powder. Further, if desired, the soluble coffee powder may contain coffee surrogates such as chicory. Such coffee powders are commercially available or may be produced by conventional extraction and drying techniques. If desired, the coffee powder may be in the form of an agglomerated powder. Preferably, the soluble coffee powder comprises about 10% to about 30% by weight of the soluble coffee beverage product, for example about 10% to about 20% by weight.

EXAMPLES

The present invention is described in detail with the aid of the examples that follow. These examples are given by way of illustration of the subject of the invention and do not constitute in any manner a limitation thereto.

Example 1

Coffee aroma was captured according to the process described in U.S. Pat. No. 5,222,364 in a coffee oil. The coffee oil was subjected to decanting to obtain an organic phase and an aqueous phase. The organic phase contained coffee oil and organic aroma components. The aqueous phase contained water and aqueous aroma components.

Soluble coffee solids were added to the aqueous phase in an amount of about 20% by dry weight of the aqueous. The resulting aqueous aroma solution was stored temporarily under cold room conditions.

A creamer powder was produced from a standardized solution containing about 25% of non-fat milk solids, about 10% of sweet whey powder, about 34% of glucose syrup, about 13% of sucrose, and about 14% of coconut fat. The percentages were on the basis of dry weight. The standardized solution is preheated to 85° C. in a plate heat exchanger and then heated to 105° C. for 5 seconds by injection of steam. The heated solution was then concentrated to a solids content of about 48% to about 50% by weight. The concentrated solution was cooled to about 40° C. and allowed to remain at this temperature for about 10 minutes.

The concentrated solution was heated to 75° C. in a plate heat exchanger and the aqueous aroma solution was mixed into the concentrated solution. Sufficient aqueous aroma solution was added to provide about 0.3% by dry weight of aqueous aroma components. The aromatized, concentrated solution was then transferred to a spray drying tower. Nitrogen was injected into the aromatized, concentrated solution prior to the spray drying tower at a pressure of about 3 bars. The gassed solution was then pumped at a pressure of 7 MPa to the nozzle of the spray-drying tower.

In the spray drying tower, the gassed solution was dried by spraying with air at 335° C. under a pressure of 15.7 kPa on entry. The primary air stream was broken up into small secondary turbulent streams under a pressure of about 7.9 kPa by a screen placed at the concentrate nozzle.

The creamer powder was then mixed with soluble coffee powder to provide a soluble coffee beverage product. The soluble coffee beverage product contained about 15% by weight of soluble coffee powder and about 85% by weight of the beverage creamer powder.

About 12 g of the powder is placed in a glass beaker and 150 ml of water at 85° C. was added with stirring. The resulting beverage had a light, fluffy, and stable foam upon a liquid of good, brown coffee color. No lumping was observed. The beverage had a good coffee aroma and flavor.

Example 2

The soluble coffee beverage product of Example 1 was packed into single serving sachets. The sachets were stored at room temperature for 3 months. Several sachets were opened and sniffed by a trained panel. The powder was considered to have a good aroma.

Further sachets were opened. Each sachet, containing about 12 g of the powder, was emptied into a separate glass beaker and 150 ml of water at 85° C. was added with stirring. The resulting beverages had a light, fluffy, and stable foam upon a liquid of good, brown coffee color. The beverages were tasted and found to have good coffee aroma and flavor. No stability problems were detected.

Example 3

An amount of 460 kg of standardized milk containing 17.3 kg of milk fat and 40.28 kg of non-fat solids was prepared. A 10% aqueous solution containing 0.4 kg of $Na_2HPO_4$ was added, followed by 39.7 kg of lactose dissolved in 150 kg of lukewarm water.

The mixture was preheated to 80° C. in a plate heat exchanger and then heated to 115° C. by injection of steam for 5 seconds. The mixture was then concentrated by evaporation to a solids content of 51%. After a dwell time of about 10 minutes at 43° C., the concentrate was reheated to 75° C. by injection of steam and left for about 5 minutes. The mixture had a solids concentration of 50%.

Sufficient aqueous aroma solution was added to the mixture to provide about 0.3% by dry weight of aqueous aroma components. Nitrogen under a pressure of about 300 kPa was then injected into the mixture. The mixture was then pumped under a pressure of 6.8 MPa to the nozzle of a spray-drying tower where it was dried by spraying with air at 330° C. at a pressure of 15.7 kPa on entry. The primary air stream was broken up into small secondary turbulent streams at a pressure of about 7.9 kPa by a screen at the spraying nozzle for the mixture.

The creamer powder was then mixed with soluble coffee powder to provide a soluble coffee beverage product. The soluble coffee beverage product contained about 15% by weight of soluble coffee powder and about 85% by weight of the beverage creamer powder.

About 12 g of the powder was placed in a glass beaker and 150 ml of water at 85° C. was added with stirring. The resulting beverage has a light, fluffy, and stable foam upon a liquid of good, brown coffee color. No lumping was observed. The beverage had a good coffee aroma and flavor.

Example 4

A creamer powder was produced from a standardized solution containing non-fat milk solids, sweet whey powder, and coconut fat. The standardized solution was preheated to about 85° C. in a plate heat exchanger and then heated to 105° C. for 5 seconds by injection of steam. The heated solution was then concentrated to a solids content of about 48% to about 50% by weight in a falling film evaporator.

The temperature of the concentrated creamer solution was adjusted to about 70° C. in a plate heat exchanger and a coffee solution was added to the concentrated creamer solution. The coffee solution had a solids concentration of about 45% by weight. Sufficient coffee extract was added such that the soluble coffee solids in the creamer powder provide about 15% by weight of the final product.

The mixture was heated to about 105° C. for about 10 seconds by injection of steam. An aqueous aroma solution of Example 1 was mixed into the concentrated solution. Sufficient aqueous aroma solution was added to provide about 0.3% by dry weight of aqueous aroma components. The mixture was then homogenized in two stages, one at about 11 MPa, and another at about 5 MPa. The homogenized mixture was transferred to a spray drying tower and dried by spraying with air at 335° C. under a pressure of 15.7 kPa on entry.

The creamer powder was then mixed with soluble coffee powder to provide a soluble coffee beverage powder. The soluble coffee beverage powder contained about 15% by weight of soluble coffee powder and about 85% by weight of the creamer powder. Therefore, the total amount of soluble coffee solids present was about 30% by weight. The soluble beverage powder was substantially homogeneous in color.

About 12 g of the soluble coffee beverage powder was placed in a glass beaker and 150 ml of water at 85° C. was added with stirring. The resulting beverage had a good, brown coffee color and a good coffee aroma and flavor. A creamy mouth feel was present. No flocculation was observed.

It will be appreciated that numerous modifications and variations may be made to the preferred embodiments described above without departing from the scope of the invention.

What is claimed is:

1. An aromatized, soluble creamer powder which comprises a matrix comprising a protein, a fat, a carbohydrate and a beverage-free aroma system consisting essentially of water-based coffee aroma components and soluble coffee solids in an amount sufficient to stabilize the aroma system, wherein the amount by weight of soluble coffee solids present in the creamer powder is about 0.01% to about 0.1%.

2. The creamer powder of claim 1, wherein the water-based coffee aroma components comprise highly volatile aqueous aroma components which condense at temperatures less than about 0° C.

3. The creamer powder of claim 1, which includes a gas therein for forming a foam upon reconstitution.

4. The creamer powder of claim 1, which further comprises an organic aroma substrate comprising organic coffee aroma components.

5. The creamer powder of claim 1, comprising about 40% to about 70% by weight sweetener, about 0.5% to about 6% by weight water-dispersible or water-soluble protein, and about 25% to about 45% by weight of an edible oil having a melting point below 10° C.

6. The creamer powder of claim 1, comprising about 5% to about 16% by weight milk proteins, about 16% to about 62% by weight lactose, about 0.2% to about 28% by weight fats, and up to about 60% by weight carbohydrates other than lactose.

7. The creamer powder of claim 1, further comprising an artificial sweetener or surfactant.

8. The creamer powder of claim 7, wherein the artificial sweetener comprises one or more of saccharin, cyclamate, acetosulfame, an L-aspartyl-based sweetener, or mixtures thereof.

9. The creamer powder of claim 7, wherein the surfactant comprises monoglyceride, distilled monoglyceride, diglyceride, glycerol monostearate, sorbitol monostearate, an ester or carboxylic acid with mono- or di-glyceride, a monosodium phosphate derivative of mono- or di-glyceride, lecithin, a diacetyl tartaric acid ester of mono- or di-glyceride, a succinylated mono- or di-glyceride, an acetylated mono- or di-glyceride, hydroxylated lecithin, a propylene glycol mono- or di-ester of a fatty acid, a polyglycerol ester of a fatty acid, a lactylic ester of a fatty acid, or mixtures thereof.

10. The creamer powder of claim 1, further comprising dipotassium phosphate or sodium citrate.

11. The creamer powder of claim 1, further comprising a flavoring agent, a coloring agent, a flowing agent, an antioxidant, or mixtures thereof.

12. The creamer powder of claim 1, comprising about 15% to about 30% by weight non-fat milk solids, about 5% to about 20% by weight sweet whey, about 5% to about 25% by weight oil or fat, and about 20% to about 70% by weight food grade sweetener.

13. The creamer powder of claim 12, wherein the sweetener comprises one or more of glucose syrup, corn syrup, sucrose, dextrose, fructose, maltodextrin, or mixtures thereof.

14. The creamer powder of claim 1, wherein the ratio of water-based coffee aroma components to soluble coffee solids in the aroma system is about 10:1 to about 3:1.

15. A soluble beverage powder comprising about 10% to about 30% by weight of soluble coffee solids and about 70% to about 90% by weight of the creamer powder of claim 1.

16. An aromatized, soluble creamer powder which comprises a matrix comprising a protein, a fat, a carbohydrate and a beverage-free aroma system consisting essentially of water-based coffee aroma components and soluble coffee solids in an amount sufficient to stabilize the aroma system, wherein the amount by weight of soluble coffee solids present in the creamer powder is about 0.01% to about 0.1%, and wherein the water-based coffee aroma components are present in a weight ratio of about 20:1 to about 1:1 to the soluble coffee solids in the aroma system.

* * * * *